GUSTAVE FASSIN
INVENTOR

Patented Nov. 8, 1938

2,135,870

UNITED STATES PATENT OFFICE 2,135,870

MICROSCOPE

Gustave Fassin, Irondequoit, N. Y., assignor to Bausch & Lomb Optical Company, Rochester, N. Y., a corporation of New York Application March 27, 1935, Serial No. 13,307

10 Claims. (Cl. 88—39)

The present invention relates to microscopes and has for its principal object the provision of a self-illuminating, enclosed microscope unit. Another object is to provide an improved rotary stage for a microscope. A further object is to provide an adjustable braking and locking means for the rotary stage. Still another object is to provide a new and improved fine adjustment mechanism for a microscope. These and other objects and advantages reside in certain novel features of construction, arrangement and combination of parts as will hereinafter be more fully set forth and pointed out in the appended claims.

Referring to the drawings:

Fig. 3 is a fragmentary sectional view showing the clamp for the stage.

Fig. 4 is a detail view showing the fine adjustment mechanism.

Figure 1:
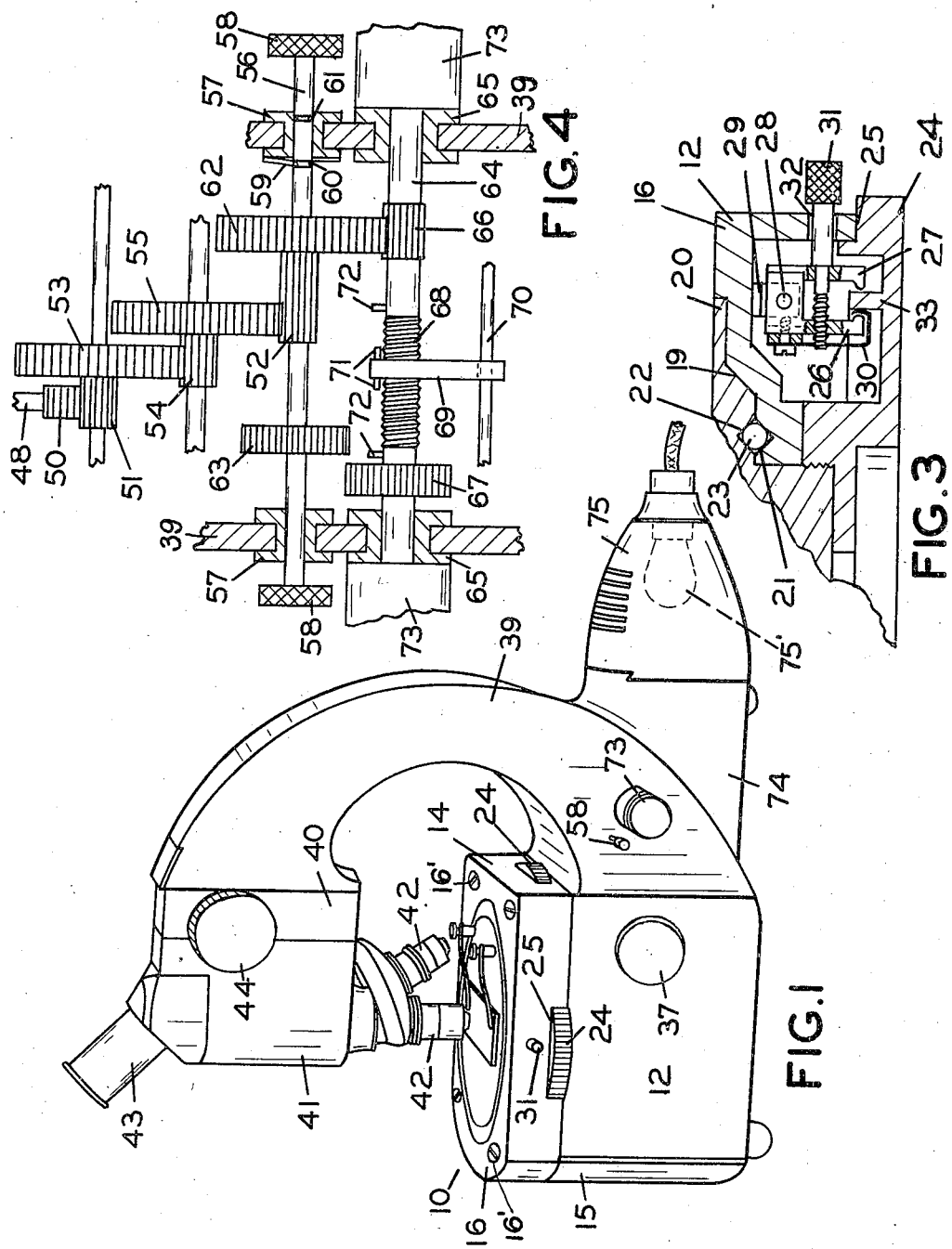
Fig. 1 is a perspective view of a microscope embodying my invention.
Figure 2:
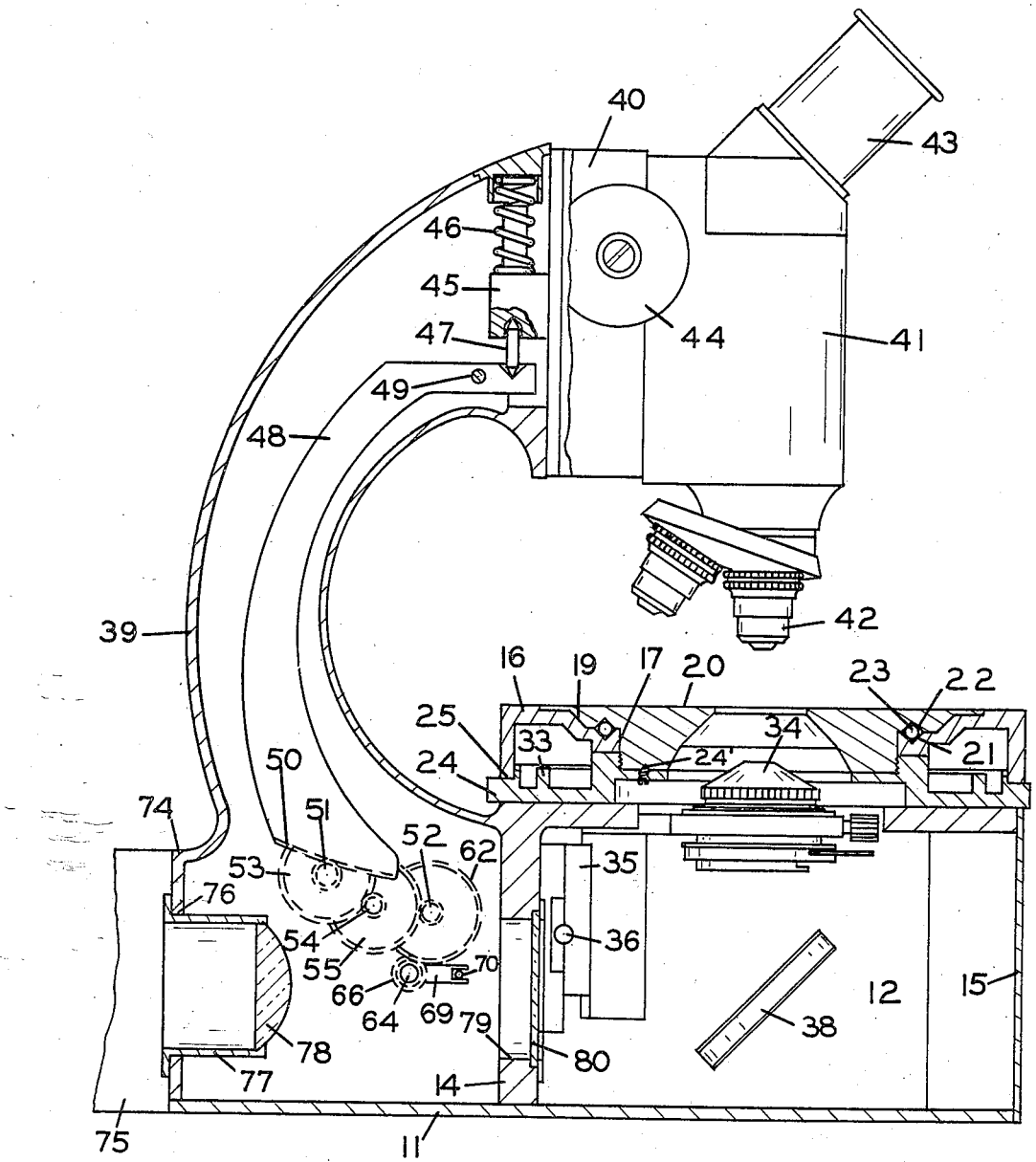
Fig. 2 is a vertical section of same with parts in elevation.

One embodiment of my invention is illustrated in the drawings wherein 10 indicates generally the base of a microscope. The base 10 is a housing enclosed by a bottom wall 11, side walls 12, a rear wall 14, a curved front wall 15 and a top 16 secured to the lower portion of the base by screws 16′. The top 16 has a central aperture 17 and is recessed at 19 to receive the circular stage 20. The top 16 and stage 20 are provided respectively with circular grooves 21 and 22 which serve as races for the balls 23. Threaded onto the stage 20 below the top 16 is an annular ring 24 which serves to hold the stage tightly against the balls 23 and flush with the top 16. A set screw 24′ holds the ring 24 against rotation. Although the front wall 15 is curved, the enclosed base 10 is substantially rectangular in form and each of the walls 12, 13, 14 and 15 is provided with an aperture 25 through which the annular ring 24 extends so that the stage 20 may be rotated.

A pair of jaws 26 and 27 are pivotally mounted upon a rod 28 on a bracket 29 which is secured to the top 16 within the housing 10. A spring 30 is secured to the jaw 26 and extends between the jaws. The jaws 26 and 27 are controlled by a screw 31 which extends through an opening 32 in the wall 12 of the housing 10. Extending upwardly between the jaws is a flange 33 of the annular ring 24. As shown in Fig. 3, tightening of the screw 31 causes the spring 30 to become a friction drag on the flange 33 and thus on the stage 20 and further tightening of the screw 31 causes the jaws 26 and 27 to lock the stage 20 in desired position.

The usual condenser 34 having a rack portion 35 is adjustably mounted within the housing 10 under the control of a pinion 36. An operating knob 37 for the pinion 36 extends through the wall 12 of the housing 10. The usual reflector 38 is also mounted within the housing 10 and its control knob, not shown, extends through the wall 13.

Extending upwardly from the rear wall 14 of the housing 10 is a hollow arm or housing 39 upon which is adjustably mounted a block 40 adjustably carrying the usual microscope lens tube 41. The usual objective 42 and eyepiece 43 are secured to the lens tube 41. The coarse focusing adjustment between the lens tube 41 and the block 40 is accomplished through the usual rack and pinion mechanism under the control of the knob 44.

For obtaining fine adjustments of focus, the block 40 is provided with an extension 45 which is pressed downwardly by a spring 46 against a pin 47 resting on a lever 48. The lever 48 is pivoted at 49 and extends downwardly through the hollow arm 39 and terminates in the arcuate gear portion 50 which meshes with a pinion 51. This pinion 51 is driven from a pinion 52 through reduction gears 53, 54 and 55. The shaft 56 upon which the pinion 52 is mounted is rotatable and slidable in bearings 57 in the walls of the hollow arm 39 and is provided with operating knobs 58. One of the bearings 57 carries a resilient latch 59 cooperating with one of the two grooves 60 and 61 in the shaft 56 for latching the shaft 56 in either of two positions.

Fixed to the shaft 56, together with the pinion 52, is a large gear 62 and a small gear 63. Directly below and parallel to the shaft 56 is a shaft 64 rotatably mounted in bearings 65 in the walls of the hollow arm 39. This shaft 64 is provided with a small gear 66 and a large gear 67 for engagement respectively with the gears 62 and 63 on the shaft 56. Between the gears 66 and 67 the shaft 64 is threaded at 68 and a rider 69, held against rotation by a rod 70, is threaded on said threaded portion 68. The rider 69 is provided with two pins 71 for cooperation with pins 72 on the shaft 64 to act as limiting stops. The shaft 64 is provided with the usual operating knobs 73.

The gears 62 and 63 on the shaft 56 are spaced apart a distance less than the spacing of the gears 66 and 67 on the shaft 64. Thus, when the latch 59 engages the groove 60, as shown in Fig.

4, the drive for the pinion 52 is through gears 66 and 62 while in the other position of the shaft 56, the drive is through gears 67 and 62. In this way, when an objective of short focal length, such as an oil immersion objective, is being used, a high motion reduction is obtained by driving the lever 48 through gears 66 and 62 while in the use of objectives of large focus, time and patience is saved by the use of the lower motion reduction afforded by the gears 67 and 62.

A tubular member 74 extends rearwardly from the arm 39 on the side opposite the enclosed base 10 and a lamp house 75 containing a lamp, indicated at 75', is secured to this extension. The rear wall of the arm 39 is provided with an aperture 76 and a condenser lens mount 77 containing a lens 78 is mounted in the aperture 76. The rear wall 14 of the housing 10 is provided with an aperture 79 which is closed by a transparent plate or filter 80. Thus the light from the lamp in the lamp house 75 passes through the condenser 78, through the arm 39 and through the aperture 79 in wall 14 to the mirror 38 where it is deflected to the microscope condenser 34.

From the foregoing it will be apparent that I am able to attain the objects of my invention and provide a new and improved microscope having an improved fine adjustment and an improved stage mechanism. Clearly the stage mechanism could be used with other microscopes and my improved selective fine adjustment is also of universal application. Various modifications can, of course, be made without departing from the spirit of my invention or the scope of the appended claims.

I claim:

1. In a microscope having a hollow arm, a lens tube slidably mounted upon said arm and a lever for effecting fine adjustments of focus of said tube, a shaft rotatably mounted within said arm, means for rotating said shaft, two gears of different size mounted upon said shaft, a second shaft slidably and rotatably mounted within said arm, two gears of different size mounted upon said second shaft, means for sliding said second shaft axially whereby one of said second two gears will mesh with one of said first two gears or the other of said second two gears will mesh with the other of said first two gears, a third gear on said second shaft and means for actuating said lever from said third gear.

2. In a microscope a hollow enclosed base, a stage forming the top of said base, a hollow arm extending upwardly from one side of said base, a microscope tube adjustably mounted on said arm, a lamp house secured to said arm on the side opposite said base, a lamp in said lamp house, means for directing light from said source through said arm into said base and a reflector within said base for directing light from said source upwardly to said microscope tube.

3. In a microscope, an enclosed base, an apertured stage forming the top of said base, a hollow arm extending upwardly from one side of said base, a lens tube adjustably mounted upon said arm, adjusting means for said tube extending downwardly through said arm to a point adjacent said base, a lamp house secured to said arm on the side opposite said base, a lamp in said lamp house, means for directing the light from said lamp through said arm into said base and means in said base for directing the light through said apertured stage to said lens tube.

4. In a microscope a support, a stage rotatably mounted upon said support, a flange on said stage and a clamp mounted upon said support for cooperation with said flange, said clamp comprising two arms, one on each side of said flange, and means for drawing said arms together to grip said flange.

5. In a microscope, a support, a stage rotatably mounted upon said support, a flange on said stage, and a clamp mounted on said support for cooperation with said flange, said clamp comprising two arms pivotally mounted on said support, one on each side of said flange, means for drawing said arms together to grip said flange and a yieldable friction member on one of said arms to engage said flange.

6. In a microscope an enclosed substantially rectangular base having side walls and a substantially rectangular top, a circular stage rotatably mounted within said base and extending upwardly flush with said top and a circular member secured to said stage extending through said side walls, whereby said stage may be rotated.

7. In a microscope having a lens tube and a lever for effecting fine adjustments of focus, a gear train for moving said lever, an adjustment knob, two gears of different size driven from said knob and means for selectively driving said gear train from either of said two gears.

8. In a microscope having a lens tube and a lever for effecting fine adjustments of focus of said tube, a rotatable shaft, knobs on said shaft for turning same, two gears of different size mounted on said shaft and means for selectively actuating said lever from either of said gears.

9. A microscope comprising three aligned housings, a microscope stage forming the top of the first housing, a reflector mounted in said first housing, the second housing being fixed to the first housing and extending upward above said first housing, a slide at the upper end of said second housing, a microscope body tube adjustably carried by said slide in alignment with said stage, adjusting means within said second housing operatively connected to said body tube to adjust the body tube for focusing, and means for actuating said adjusting means extending outward from said second housing, the third housing being detachably fixed to the second housing opposite the first housing, a lamp in said third housing, said three housings having openings in alignment with said lamp and said reflector, and means for directing light from said lamp out of said third housing through said second housing to the reflector in said first housing.

10. A microscope comprising a housing, a microscope condenser adjustably mounted therein, means extending through the side of said housing for actuating said condenser, a reflector in said housing beneath said condenser, a microscope stage rotatably mounted in the upper part of said housing and forming the top of said housing, means for locking said stage in any desired position, a second housing fixed to the first housing at one side thereof and extending upward above the first housing, a slide at the upper end of the second housing, a microscope body tube adjustably carried by said slide in alignment with the axis of rotation of said stage, a mechanism carried within said second housing for adjusting said body tube, adjusting means extending from the side of the second housing adjacent the condenser actuating means, adjustable means for interconnecting said adjusting means and said mechanism, means extending through the side of the second housing adjacent said condenser actuating means and said adjusting means for varying said adjustable means, a third housing secured to said second housing opposite the first housing, a lamp in said third housing, said three housings having openings in alignment with said lamp and said reflector, and means for directing light from said lamp through said openings to said reflector and through said condenser toward said body tube.

GUSTAVE FASSIN.